H. T. McKEE.
MILKING STOOL.
APPLICATION FILED JUNE 4, 1917.
1,277,233.
Patented Aug. 27, 1918.
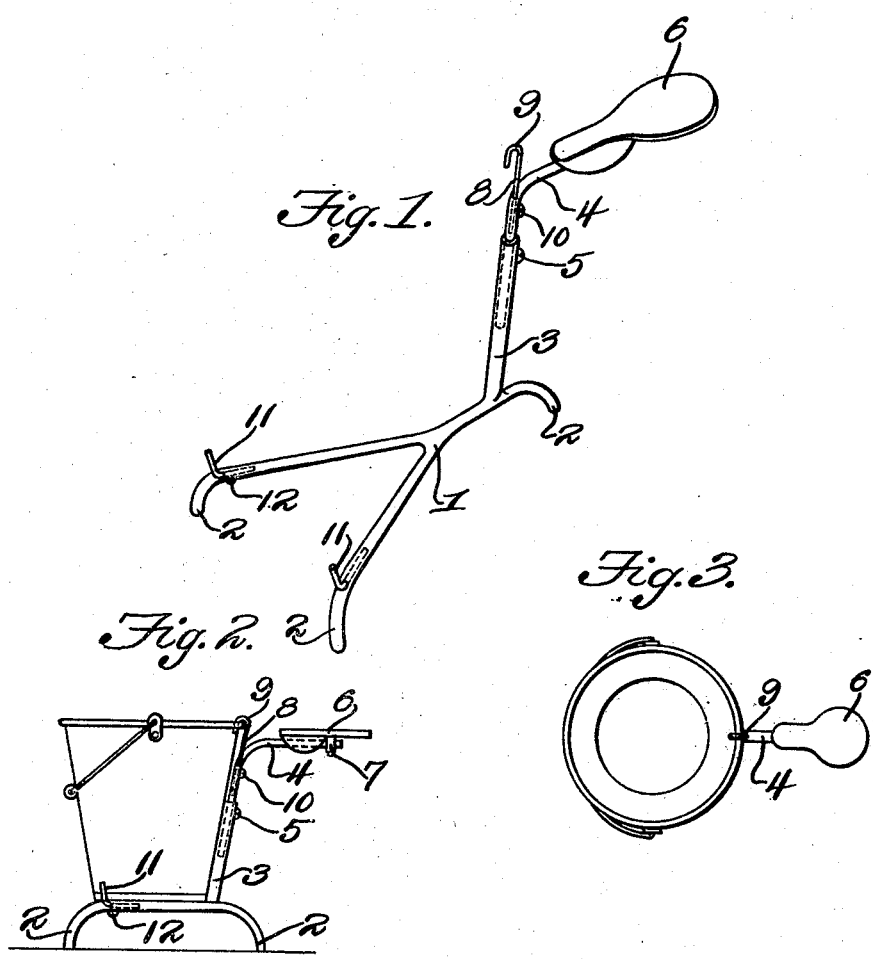
WITNESSES
John P. Woodworth
L. B. Middleton
INVENTOR
Harold T. McKee.
BY Richard B. Owen,
ATTORNEY

UNITED STATES PATENT OFFICE.

HAROLD T. McKEE, OF NEAR McCLOUD, CALIFORNIA.

MILKING-STOOL.

1,277,233.　　　　Specification of Letters Patent.　　Patented Aug. 27, 1918.

Application filed June 4, 1917. Serial No. 172,837.

*To all whom it may concern:*

Be it known that I, HAROLD T. McKEE, a citizen of the United States, residing near the town of McCloud, in the county of Siskiyou and State of California, have invented certain new and useful Improvements in Milking-Stools, of which the following is a specification.

This invention relates to new and useful improvements in milking stools and the principal object of the invention is to provide a combined stool and pail support affording a seat for the milker and supporting the milk pail in proper milking position.

Another object of the invention is to provide means for making the seat adjustable and to provide means for making the pail holding clips adjustable to suit different sizes of pails.

Another object of the invention is to provide a device of this character, which is simple and durable in construction, reliable and efficient in operation and one which can be manufactured and placed upon the market at a minimum cost.

The invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings, wherein like characters denote like or corresponding parts throughout the several views, and in which:—

Figure 1 is a perspective view of the invention.

Fig. 2 is a side view thereof showing a pail in position, and

Fig. 3 is a plan view with a pail in position.

In these figures, 1 indicates the bottom part of the stool which is made in the shape of a Y having its three ends curving downwardly to form the supporting legs 2. 3 indicates the seat supporting member which extends upwardly from the stem of the Y and is made of tubular form to receive the end of the seat supporting bracket 4. This bracket is adjustably held within the member 3 by means of the screw 5. The bracket 4 is bent at substantially a right angle to receive the seat 6 which is adjustably secured thereon by means of the clip 7. A rod 8 having a hooked end 9 is adjustably mounted in the seat bracket by means of a screw 10, this rod 8 passing through a hole formed on the vertical part of the seat bracket. A rod 11 having one end bent upwardly is inserted in a hole formed in each of the legs of the Y adjacent the point where the said legs are bent downwardly and these rods are adjustably held in the holes by means of the screws 12.

The pail is placed on the horizontal part of the stool and is secured thereon by means of the hook 9 and rods 11, said hook and rods being adjusted to grip the pail. The stool with the pail thereon may then be moved to milking position and after one cow is milked the pail may be emptied without removing the same from the stool and then the device moved to milk another cow. Of course, if desired, the pail may be removed from the stool after the cow is milked.

The stool may be made of any suitable material though as shown in the drawings I prefer to make the stool of tubing so as to make it light in weight and yet of sufficient strength.

It is thought from the foregoing that the advantages and novel features of my invention will be readily apparent.

I desire it to be understood that I may make slight changes in the construction and in the combination and arrangement of the several parts, provided that such changes fall within the scope of the appended claims.

I claim:

1. A milking stool comprising a bottom part of Y-shape having its ends curved downwardly to form legs, an upright secured to the stem of the Y, a seat bracket adjustably mounted in said upright, a rod having a hooked end adjustably secured in said seat bracket and a bent rod adjustably secured in each leg member of the Y adjacent the curved portion.

2. A milking stool comprising a bottom adapted to receive a milk pail, means on said part for preventing said pail from sliding, an upright carried by said bottom part, a seat secured thereto, and a downwardly projecting hook adjustably mounted in said upright and adapted to engage the upper edge of the milk pail for preventing it from tipping over.

3. A milking stool comprising a pail supporting part of Y-shape, adjustable means carried by the arms thereof for engagement with the pail, an upright secured to the stem of the Y for engagement with the pail, and a seat carried by said upright.

In testimony whereof I affix my signature in presence of two witnesses.

HAROLD T. McKEE.

Witnesses:
O. E. HANCOCK,
L. C. STRAUB.

Copies of this patent may be obtained for five cents each, by addressing the "Commissioner of Patents, Washington, D. C."